United States Patent
Jung et al.

(10) Patent No.: US 10,298,363 B2
(45) Date of Patent: May 21, 2019

(54) BUFFER MANAGEMENT METHOD FOR D2D COMMUNICATION, AND WIRELESS DEVICE

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/557,385

(22) PCT Filed: Mar. 31, 2016

(86) PCT No.: PCT/KR2016/003333
§ 371 (c)(1),
(2) Date: Sep. 11, 2017

(87) PCT Pub. No.: WO2016/159686
PCT Pub. Date: Oct. 6, 2016

(65) Prior Publication Data
US 2018/0115395 A1    Apr. 26, 2018

Related U.S. Application Data

(60) Provisional application No. 62/140,472, filed on Mar. 31, 2015.

(51) Int. Cl.
H04W 74/00    (2009.01)
H04L 1/18     (2006.01)
(Continued)

(52) U.S. Cl.
CPC .............. *H04L 1/1874* (2013.01); *H04L 1/18* (2013.01); *H04L 1/1812* (2013.01);
(Continued)

(58) Field of Classification Search
CPC ..... H04L 1/1874; H04L 5/001; H04L 1/1893; H04L 5/0055; H04L 1/1812; H04L 1/18; H04L 1/004
See application file for complete search history.

(56) References Cited

U.S. PATENT DOCUMENTS 7,376,195 B2 *  5/2008  Jonsson ............... H04B 1/7113
                                              375/262
8,171,362 B2 *  5/2012  Grovlen ................ H04L 1/1835
                                              455/226.1
(Continued)

FOREIGN PATENT DOCUMENTS

WO    WO 2014-007580 A1    1/2014

OTHER PUBLICATIONS

LG Electronics, "Other Remaining Issues for D2D and WAN Co-existence", R1-144330 3GPP TSG RAN WG1 #78bis, Ljubljana, Slovenia; Oct. 2014, 5 pages.
(Continued)

*Primary Examiner* — Phuc H Tran
(74) *Attorney, Agent, or Firm* — Birch, Stewart, Kolasch & Birch, LLP

(57) ABSTRACT

One embodiment of the present specification provides a method by which a wireless device manages a buffer for performing soft combining. The method can comprise the steps of: decoding data received through device-to-device (D2D) communication; determining whether an error exists in the decoded data; determining whether a radio resource control (RRC) connection with a base station is established or/and a carrier aggregation is configured and activated if the
(Continued)

error exists; taking at least one from among an instantaneous buffer to be used when the carrier aggregation is activated and a hybrid automatic repeat request (HARQ) buffer to be used when the RRC connection is established, on the basis of whether the RRC connection with the base station is established and whether the carrier aggregation is activated; and storing, in the taken one or more buffers, a soft bit for performing soft combining.

14 Claims, 15 Drawing Sheets

(51) Int. Cl.
  *H04L 5/00* (2006.01)
  *H04L 1/00* (2006.01)
(52) U.S. Cl.
  CPC ............ *H04L 1/1893* (2013.01); *H04L 5/001* (2013.01); *H04L 5/0055* (2013.01); *H04L 1/004* (2013.01)

(56) References Cited

U.S. PATENT DOCUMENTS

| | | | | |
|---|---|---|---|---|
| 9,209,945 | B2* | 12/2015 | Liu | H04W 72/042 |
| 9,973,916 | B2* | 5/2018 | Niu | H04W 74/02 |
| 2012/0300699 | A1* | 11/2012 | Kamuf | H04L 1/1845 |
| | | | | 370/328 |
| 2014/0185530 | A1 | 7/2014 | Kuchibhotla et al. | |
| 2015/0049710 | A1* | 2/2015 | Zhang | H04L 1/1819 |
| | | | | 370/329 |
| 2016/0088635 | A1* | 3/2016 | Davydov | H04L 1/1812 |
| | | | | 370/329 |
| 2017/0222764 | A1* | 8/2017 | Scherb | H04L 1/1835 |

OTHER PUBLICATIONS

Qualcomm Incorporated, "Further Discussion on Bandwidth Combination for CA Demodulation Test", R4-131295, 3GPP TSG RAN WG4 #66bis, Chicago, USA, Apr. 2013, 9 pages.

Samsung, "Soft Buffer Handling for PDSCH and D2D Data", R1-143863, 3GPP TSG RAN WG1 #78bis, Ljubljana, Slovenia, Oct. 2014, 5 pages.

* cited by examiner

BUFFER MANAGEMENT METHOD FOR D2D COMMUNICATION, AND WIRELESS DEVICE

CROSS REFERENCE TO RELATED APPLICATIONS

This application is the National Phase of PCT International Application No. PCT/KR2016/003333, filed on Mar. 31, 2016, which claims priority under 35 U.S.C. 119(e) to U.S. Provisional Application No. 62/140,472, filed on Mar. 31, 2015, all of which are hereby expressly incorporated by reference into the present application.

BACKGROUND OF THE INVENTION

Field of the Invention

The present invention relates to a method of managing the buffer and a wireless device for performing the same in the D2D (Device-to-Device) communication

Related Art

Long term evolution (LTE) based on 3rd Generation Partnership Project (3GPP) Technical Specification (TS) is one of mobile communication standards. 3GPP LTE-A (advanced), an evolution of 3GPP LTE, introduced carrier aggregation.

Meanwhile, an error compensation technique, which is to secure the reliability of wireless communications, includes a forward error correction (FEC) scheme and automatic repeat request (ARQ) scheme. In the forward error correction (FEC) scheme, an error at a reception unit is corrected by adding extra error correction codes to information bits. The FEC scheme has an advantage in that there is less time delay and no information required to be transmitted and received between a transmission unit and a reception unit, however, it is a weak point that system efficiency is low in good channel conditions. The ARQ scheme is strong at transmission reliability, however, it causes time delay and the system efficiency is low in poor channel conditions.

The hybrid automatic repeat request (HARQ) is a scheme in which FEC and ARQ are coupled, it checks whether to include an error that data received by a physical layer cannot be decoded, and if the error is occurred, efficiency can be increased by requesting retransmission. A receiver in HARQ, if an error is not detected in data received, informs a success of the reception by transmitting an acknowledgement signal to the reception acknowledgement. If an error is detected in data received, a receiver informs a transmitter of the error detected by transmitting a NACK signal to the reception acknowledgement. If the NACK signal is received, the transmitter may retransmit data.

On the other hand, D2D communication (device-to-device communication) is a distributed communication technology in which adjacent wireless nodes directly transmit traffic. In D2D communication, a wireless node such as a cellular phone can search for another wireless node physically adjacent to itself set up a communication session, and then transmit the traffic. D2D communication, such as Bluetooth (Bluetooth) or WiFi Direct supports direct communication between the wireless nodes without the support of the base station. Further, it is also possible that communication D2D scheduling is managed by the base station for D2D communication. Thus, D2D communication managed by the base station to spread traffic from concentrating in the base station can reduce the traffic overload problem.

However, the 3GPP does not force separate resource allocation for performing soft combining in a HARQ procedure of D2D communication. Therefore, in a HARQ procedure of D2D communication, a method of managing a buffer for performing soft combining may become a problem.

SUMMARY OF THE INVENTION

The present invention provides a method of managing a buffer for soft combining in D2D communication.

The present invention further provides a wireless device that can manage a buffer for soft combining in D2D communication.

In an aspect, a method in which a wireless device manages a buffer for performing soft combining is provided. The method includes decoding data received through Device-to-Device (D2D) communication; determining whether an error exists in the decoded data; determining, if an error exists in the decoded data, whether a Radio Resource Control (RRC) connection with a base station is established and whether carrier aggregation is activated; taking at least one of an instantaneous buffer to be used when carrier aggregation is activated and a Hybrid Automatic Repeat reQuest (HARQ) buffer to be used when an RRC connection is established based on whether the RRC connection with the base station is established and whether the carrier aggregation is activated; and storing a soft bit for performing the soft combining at the at least one taken buffer.

The taking of at least one may include determining, when an RRC is established and when the carrier aggregation is activated, whether to preferentially take which buffer of the instantaneous buffer and the HARQ buffer based on an average receiving Signal to Noise Ratio (SNR) of a signal received from the base station and a Channel Quality Indicator (CQI) value.

The taking of at least one may include preferentially taking, when the average receiving SNR or the CQI value is smaller than a predetermined threshold value, the instantaneous buffer rather than the HARQ buffer.

The taking of at least one may include comparing, if the average receiving SNR or the CQI value is larger than a predetermined threshold value, the bit number of a HARQ buffer allocated to a HARQ procedure for retransmission and a maximum HARQ buffer size to determine whether to preferentially take which buffer of the instantaneous buffer and the HARQ buffer.

The taking of at least one may include preferentially taking the instantaneous buffer rather than the HARQ buffer when the bit number of a HARQ buffer allocated to a HARQ procedure for the retransmission does not exceed the maximum HARQ buffer size.

The taking of at least one may include randomly taking at least one buffer of the instantaneous buffer and the HARQ buffer when an RRC connection with the base station is not established.

The taking of at least one may include preferentially taking the instantaneous buffer rather than the HARQ buffer, when an RRC connection with the base station is established, but when the carrier aggregation is not activated.

The storing of a soft bit may include storing the soft bit at the at least one taken buffer, but storing the soft bit in reverse order from a final position of the taken buffer.

In another aspect, a wireless device that manages a buffer for performing soft combining is provided. The wireless device includes a radio frequency (RF) unit that transmits and receives a wireless signal; and a processor that controls the RF unit, wherein the processor performs a procedure that performs decoding of data received through D2D communication; determines whether an error exists in the decoded data; determines whether an RRC connection with the base station is established and whether carrier aggregation is activated, if an error exists in the decoded data; takes at least one of an instantaneous buffer to be used when the carrier aggregation is activated and a HARQ buffer to be used when the RRC connection is established based on whether the RRC connection with the base station is established and whether carrier aggregation is activated; and stores a soft bit for performing the soft combining at the at least one taken buffer.

Advantageous Effects

According to disclosure of this specification, by performing soft combining using an instantaneous buffer, a performance of D2D communication can be improved.

DESCRIPTION OF EXEMPLARY EMBODIMENTS

Figure 1:
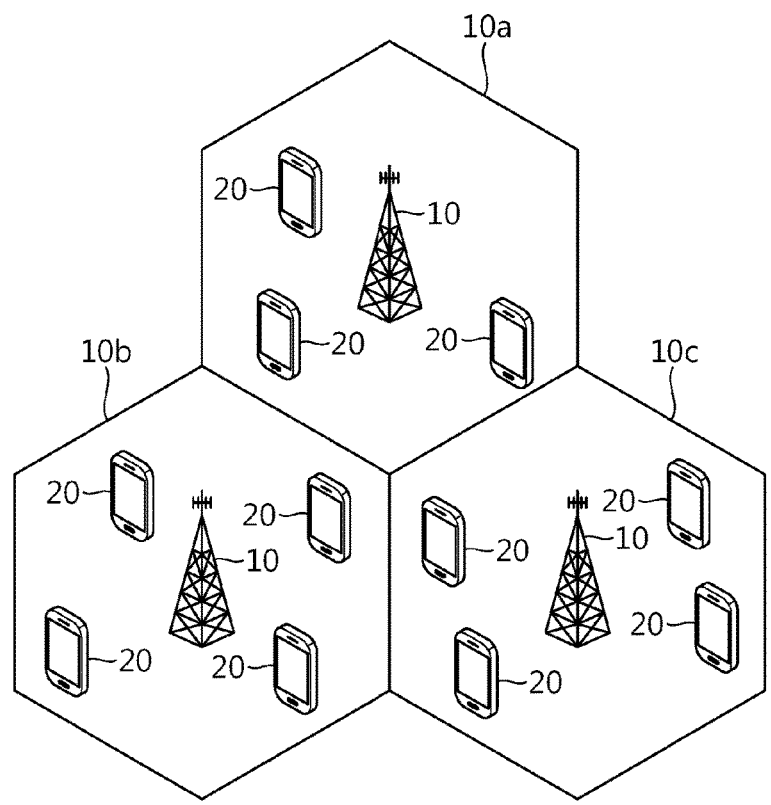
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UEI 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Hereinafter, the LTE system will be described in detail.

Figure 2:
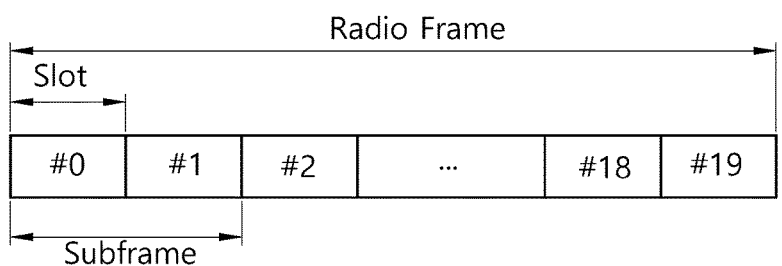
FIG. 2 illustrates the structure of a radio frame according to FDD (frequency division duplex) in 3GPP LTE.

FIG. 2 illustrates the structure of a radio frame according to FDD (frequency division duplex) in 3GPP LTE.

For the radio frame shown in FIG. 2, 3GPP (3rd Generation Partnership Project) TS 36.211 V8.2.0 (2008-03) "Technical Specification Group Radio Access Network; Evolved Universal Terrestrial Radio Access (E-UTRA); Physical channels and modulation (Release 8)", Ch. 5 may be referenced.

Referring to FIG. 2, a radio frame includes 10 sub-frames, and one sub-frame includes two slots. The slots in the radio frame are marked with slot numbers 0 through 19. The time taken for one sub-frame to be transmitted is referred to as a TTI (transmission time interval). The TTI may be the unit of scheduling for data transmission. For example, the length of one radio frame may be 10 ms, the length of one sub-frame may be 1 ms, and the length of one slot may be 0.5 ms.

The structure of a radio frame is merely an example, and the number of sub-frames included in the radio frame or the number of slots included in a sub-frame may vary differently.

Meanwhile, one slot may include a plurality of OFDM symbols. How many OFDM symbols are included in one slot may vary depending on cyclic prefix (CP).

Figure 3:
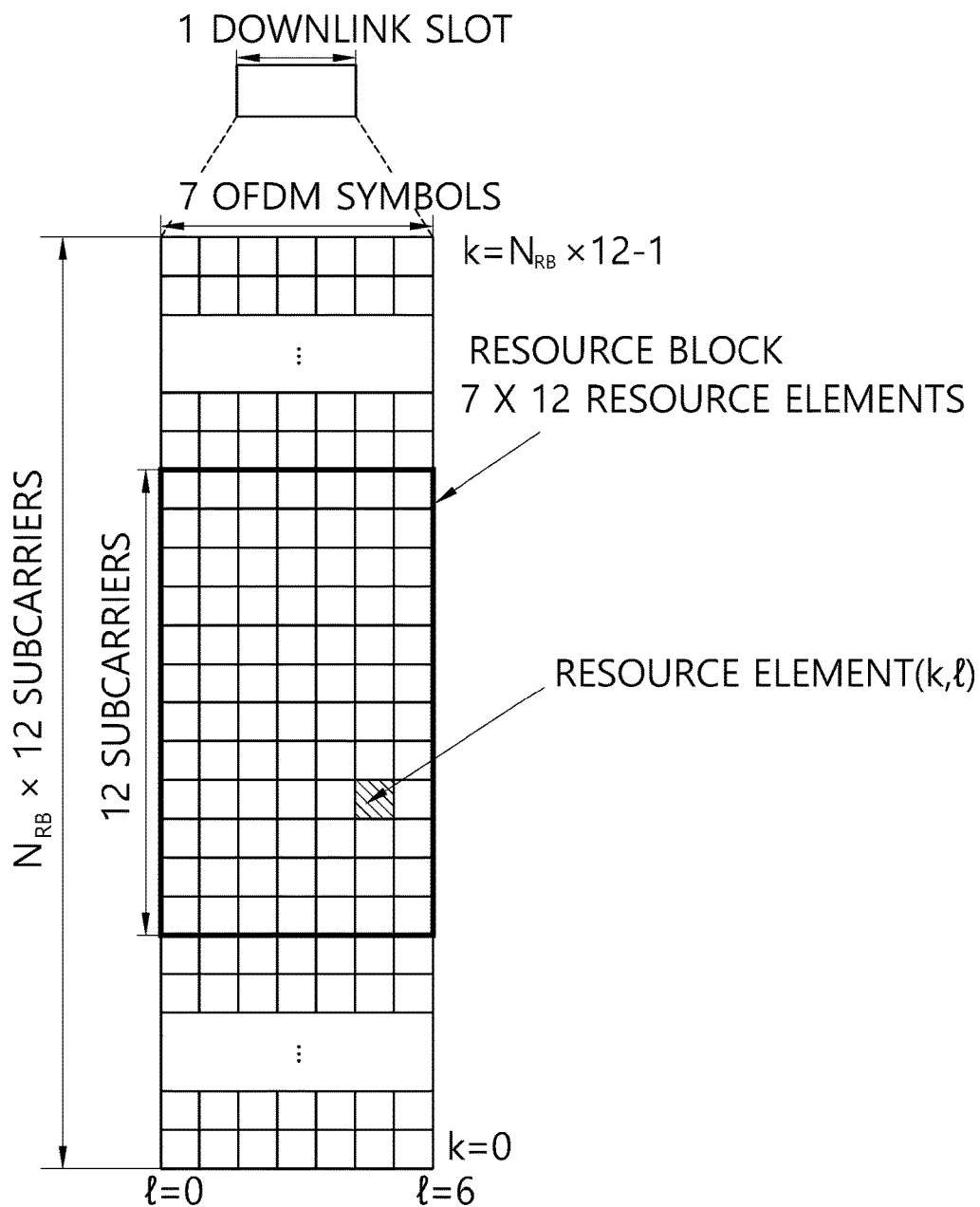
FIG. 3 illustrates an example resource grid for one uplink or downlink slot in 3GPP LTE.

FIG. 3 illustrates an example resource grid for one uplink or downlink slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

Figure 4:
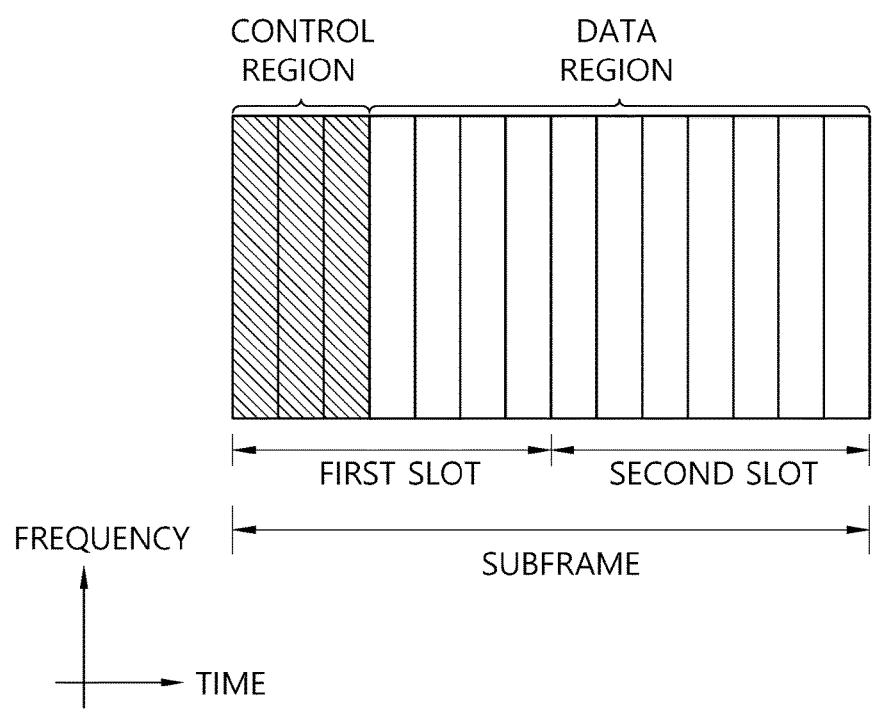
FIG. 4 illustrates the architecture of a downlink sub-frame in 3GPP LTE.

In 3GPP LTE, the resource grid for one uplink slot shown in FIG. 4 may also apply to the resource grid for the downlink slot.

FIG. 4 illustrates the architecture of a downlink sub-frame.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Figure 5:
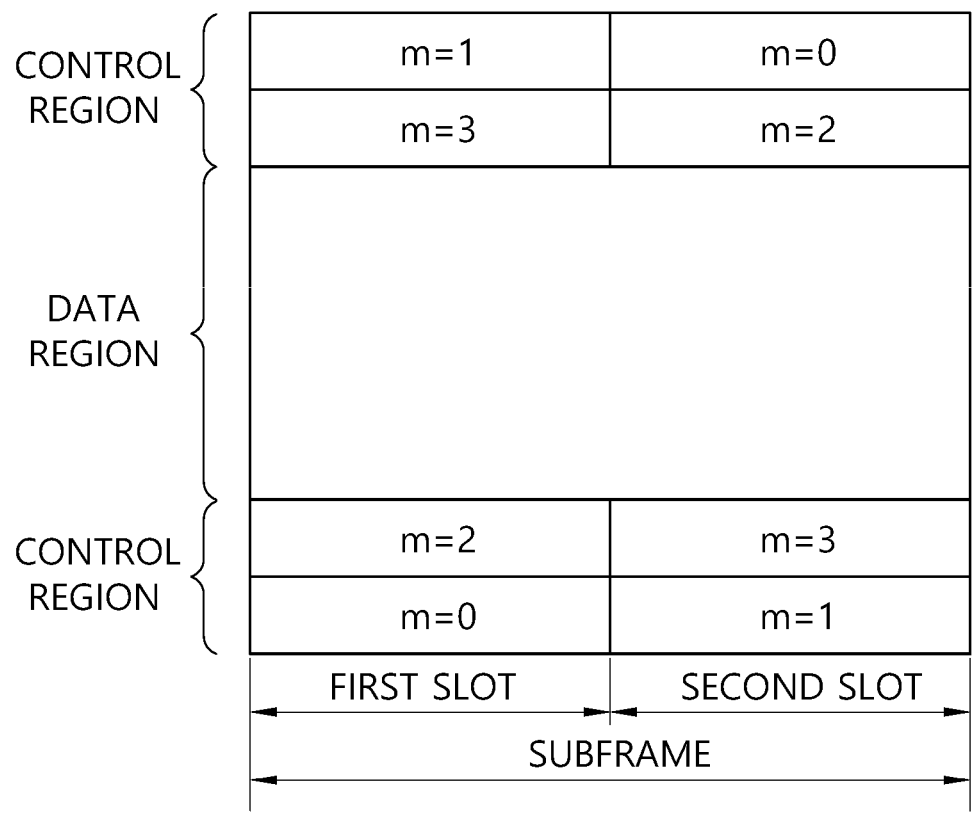
FIG. 5 illustrates the architecture of an uplink sub-frame in 3GPP LTE.
Figure 5:
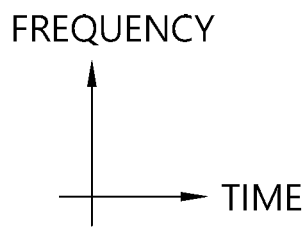

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/ NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

FIG. 5 illustrates the architecture of an uplink sub-frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

<Carrier Aggregation: CA>

A carrier aggregation system is now described.

Figure 6:
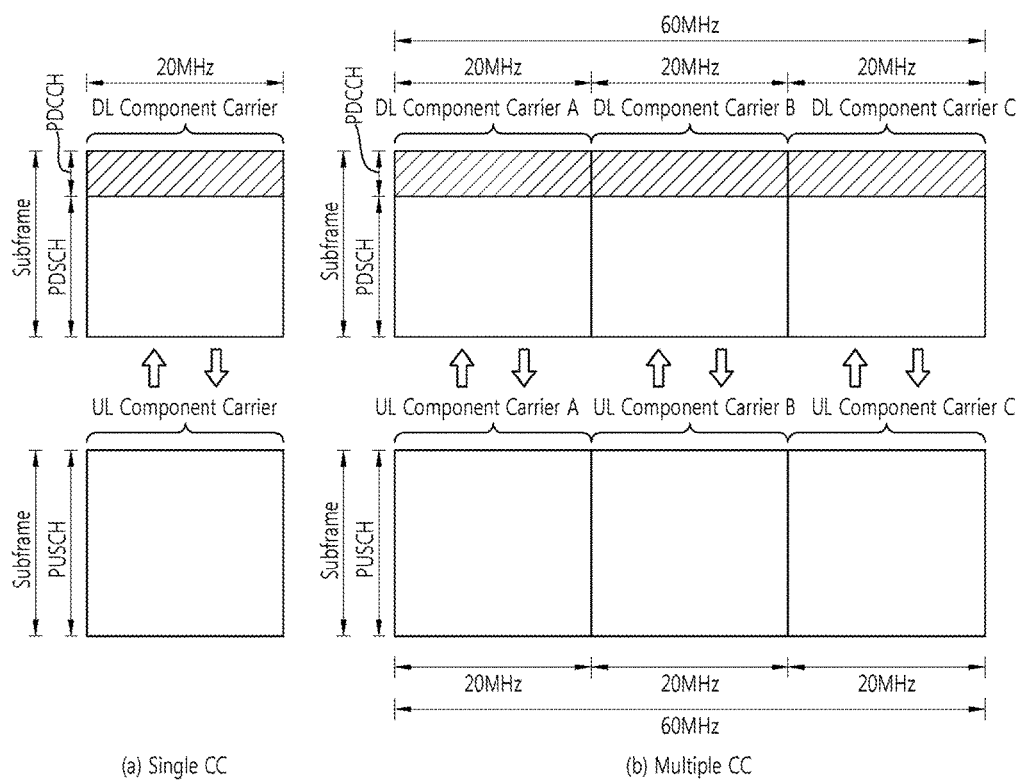
FIG. 6 illustrates an example of comparison between a single carrier system and a carrier aggregation system.

FIG. 6 illustrates an example of comparison between a single carrier system and a carrier aggregation system.

Referring to FIG. 6, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where CA is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

<Hybrid Automatic Repeat reQuest (HARQ)>

Hereinafter, a HARQ will be described.

Figure 7:
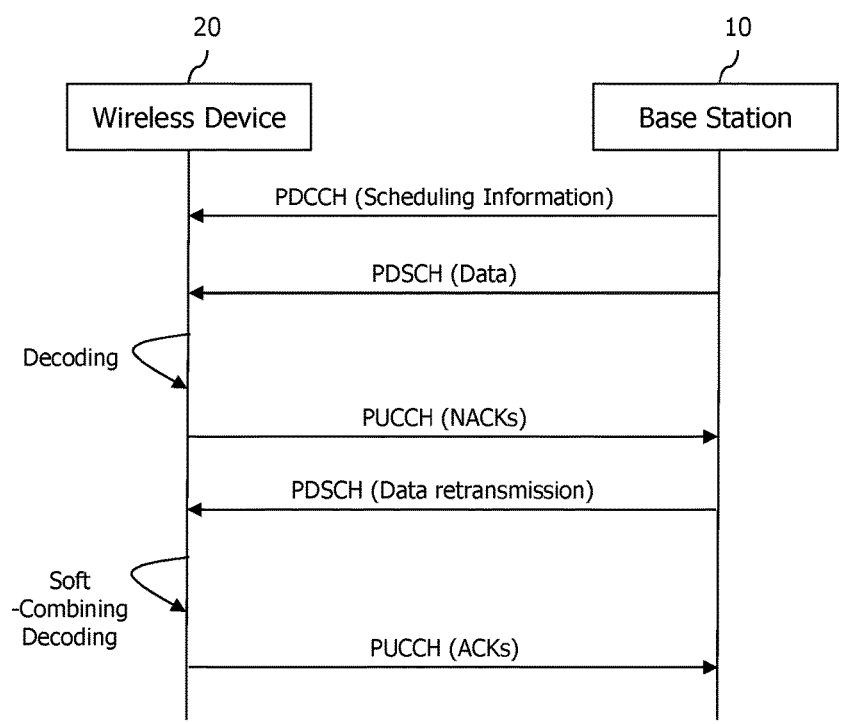
FIG. 7 is a diagram illustrating a HARQ procedure between a base station and a wireless device.

FIG. 7 is a diagram illustrating a HARQ procedure between a base station and a wireless device.

In order to transmit data to a wireless device 20 with a HARQ method, a base station 10 transmits scheduling information through a Physical Downlink Control CHannel (PDCCH) control channel.

The wireless device 20 monitors the PDCCH to determine scheduling information transmitted thereto.

When information about the wireless device 20 exists according to determination of scheduling information, the wireless device 20 receives data from the base station 10 through a Physical Downlink Shared CHannel (PDSCH) at a time point related to the PDCCH.

When data are received, the wireless device 20 attempts decoding of the received data. The wireless device 20 transmits HARQ feedback to the base station 10 according to a decoding result. More specifically, when decoding is succeeded, the wireless device 20 transmits an Acknowledgement (ACK) signal to the base station 10. However, when decoding is failed, the wireless device 20 stores data failed in decoding at a HARQ buffer and transmits a Not-Acknowledgement (NACK) signal to the base station 10 through the PUCCH or the PUSCH.

When the base station 10 receives an ACK signal, the base station 10 determines that data transmission to the wireless device is succeeded and transmits next data. However, when the base station 10 receives a NACK signal, the base station 10 determines that data transmission to the wireless device 20 is failed and retransmits the same data in the same form or a new form at an appropriate time point.

When retransmitted data are received, the wireless device 20 soft-combines retransmitted data and data stored at the HARQ buffer to reattempt decoding. When reattempt of decoding is succeeded, the wireless device 20 transmits an ACK signal to the base station 10. However, when reattempt of decoding is failed, the wireless device 20 stores data failed in reattempt at the HARQ buffer and again transmits a NACK signal to the base station 10.

Until decoding of data is succeeded, the wireless device 20 may transmit a NACK signal and repeatedly perform a process of attempting decoding of data re-received from the base station 10.

Figure 8:
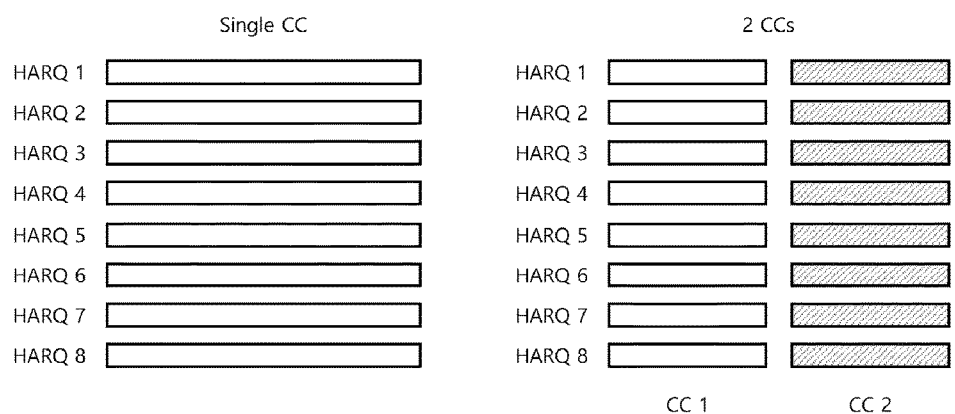
FIG. 8 is a conceptual diagram illustrating an example of a soft-buffer divided according to the number of component carriers.

FIG. 8 is a conceptual diagram illustrating an example of a soft-buffer divided according to the number of component carriers (CC).

A 3GPP prescribes a size of a soft-buffer for performing soft combining according to of a category of the wireless device 20. A maximum size of a soft-buffer on a category basis of the wireless device 20 prescribed in the 3GPP is represented in Table 1.

TABLE 1

| Category of wireless device | The maximum number of received DL-SCH transport block bits within one TTI | The maximum bit number of received DL-SCH transport blocks within one TTI | The maximum number of bits of soft channel | The maximum number of layers supported for spatial multiplex in downlink |
|---|---|---|---|---|
| Category 0 | 1000 | 1000 | 25344 | 1 |
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layer) 75376 (2 layer) | 3654144 | 2 or 4 |
| Category 7 | 301504 | 149776 (4 layer) 75376 (2 layer) | 3654144 | 2 or 4 |

TABLE 1-continued

| Category of wireless device | The maximum number of received DL-SCH transport block bits within one TTI | The maximum bit number of received DL-SCH transport blocks within one TTI | The maximum number of bits of soft channel | The maximum number of layers supported for spatial multiplex in downlink |
|---|---|---|---|---|
| Category 8 | 2998560 | 299856 | 35982720 | 8 |
| Category 9 | 452256 | 149776 (4 layer) 75376 (2 layer) | 5481216 | 2 or 4 |
| Category 10 | 452256 | 149776 (4 layer) 75376 (2 layer) | 5481216 | 2 or 4 |

In a 3GPP specification, a soft-buffer for a HARQ procedure of the wireless device 20 is divided and used into the minimum $K_{MIMO} \cdot \min(M_{DL\_HARQ}, M_{limit})$ number for each component carrier (CC). Here, when a transmission mode (TM) of the wireless device 20 is set to TM3/4/8/9/10 and when the wireless device 20 receives a PDSCH, $K_{MIMO}$ is 2, and when the wireless device 20 is set to other transmission modes (TM), $K_{MIMO}$ is 1. $M_{DL\_HARQ}$ is a maximum value of a downlink HARQ procedure, and $M_{limit}$ may be set to 8.

Accordingly, when a transmission mode (TM) of the wireless device 20 is set to TM3/4/8/9/10, the wireless device 20 divides a soft-buffer into maximum 16, and when a transmission mode (TM) of the wireless device 20 is set to other transmission modes, the wireless device 20 divides a soft-buffer into maximum 8 and allocates the divided soft-buffer to each HARQ procedure.

A size of such a soft-buffer is defined on the wireless device 20 basis, but when the wireless device 20 operates in a CA environment, the soft-buffer may be divided according to the number of CCs using in CA. For example, when the number of CCs using in CA is two, a soft-buffer allocated to each HARQ procedure may be divided, as shown in FIG. 8.

Figure 9:
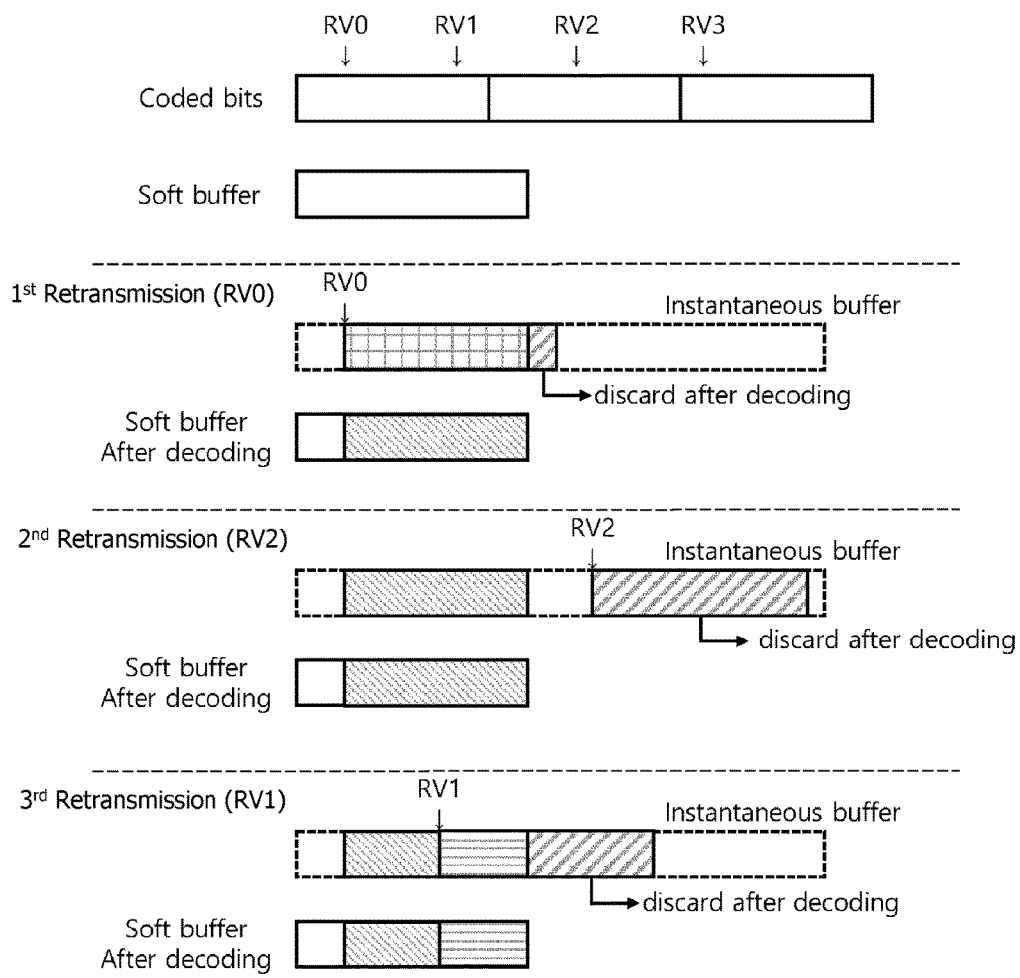
FIG. 9 is a conceptual diagram illustrating an operation of an instantaneous buffer.

FIG. 9 is a conceptual diagram illustrating an operation of an instantaneous buffer.

In order to compensate performance deterioration according to size reduction of a soft-buffer according to the number of CCs using in CA, in a 3GPP specification, use of an instantaneous buffer has been silently forced. A size of such an instantaneous buffer corresponds to a maximum buffer size of a HARQ procedure allocated based on a single carrier element (single CC) on a category basis of the wireless device 20. A detailed operation process of the instantaneous buffer is shown in FIG. 9.

<Device to Device (D2D) Communication>

Hereinafter, D2D communication will be described.

Figure 10:
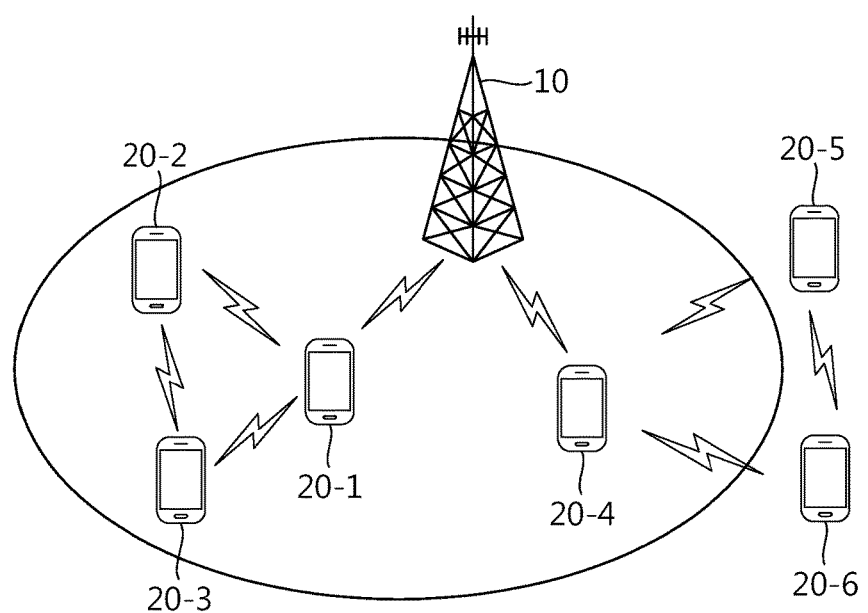
FIG. 10 is a diagram illustrating a concept of Device to Device (D2D) communication.

FIG. 10 is a diagram illustrating a concept of D2D communication.

Due to increase in user requirements for a Social Network Service (SNS), communication, i.e., D2D communication between wireless devices in a physically adjacent distance is required.

In order to reflect the foregoing requirements, as shown in FIG. 7, a method of enabling a first wireless device 20-1, a second wireless device 20-2, and a third wireless device 20-3 or a fourth wireless device 20-4, a fifth wireless device 20-5, and a sixth wireless device 20-6 to directly communicate without intervention of the base station 10 has been discussed. The first wireless device 20-1 and the fourth wireless device 20-4 may directly communicate under assistance of the base station 10. The first wireless device 20-1 may perform a function as a relay for the second wireless device 20-2 and the third wireless device 20-3. Similarly, the fourth wireless device 20-4 may perform a function as a relay for the fifth wireless device 20-5 and the sixth wireless device 20-6 separated far from the center of a cell.

A link between wireless devices used for the D2D communication may be referred to as a sidelink.

A physical channel used for the sidelink is as follows.

Physical Sidelink Shared Channel (PSSCH)
Physical Sidelink Control Channel (PSCCH)
Physical Sidelink Discovery Channel (PSDCH)
Physical Sidelink Broadcast Channel (PSBCH)

As described above, in a next system, it is discussed that D2D communication between wireless devices will be introduced.

Figure 11:
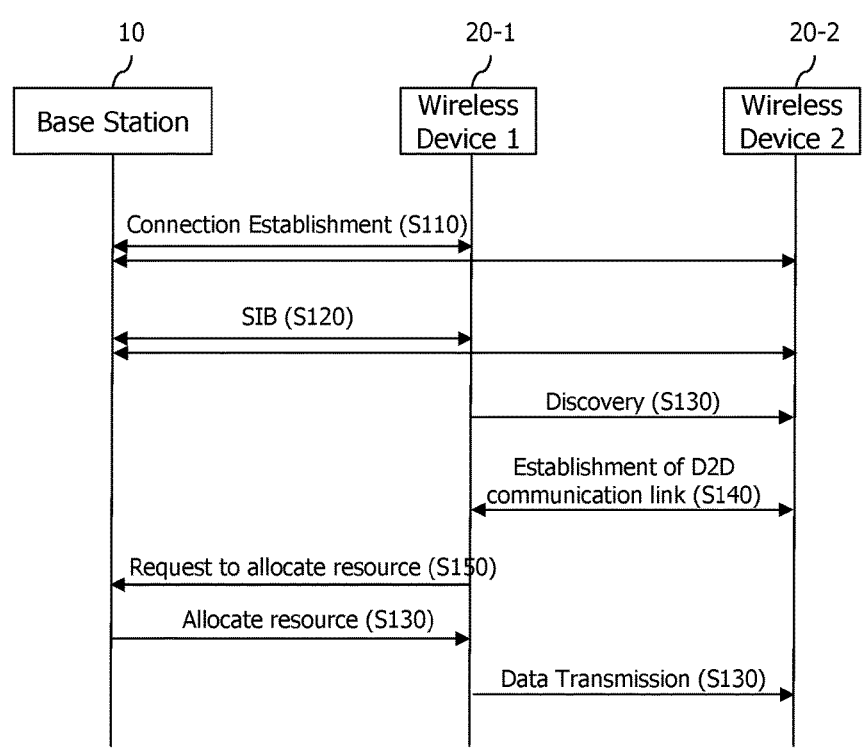
FIG. 11 is a message flow diagram illustrating a summary of D2D communication.

FIG. 11 is a message flow diagram illustrating a summary of D2D communication.

Referring to FIG. 11, the first wireless device 20-1 and the second wireless device 20-2 each establish a connection with the base station 10 (S110). For example, the first wireless device 20-1 and the second wireless device 20-2 may establish a Radio Resource Control (RRC) connection.

The first wireless device 20-1 and the second wireless device 20-2 receive a system information block (SIB) broadcasted by the base station 10 (S120).

The SIB may include information about a resource pool related to D2D communication. Information about a resource pool related to the D2D communication may be divided into SIB type 18 and SIB type 19.

The SIB type 18 may instruct a network that supports a D2D communication procedure and include resource setup information for D2D communication. The SIB type 19 may instruct a network that supports a D2D communication procedure and include resource setup information related to D2D discovery.

The first wireless device 20-1 performs discovery for distinguishing another device based on information about a resource pool included in the received SIB (S130). More specifically, the first wireless device 20-1 may broadcast D2D discovery notification including a synchronization signal thereof and identification information. The second wireless device 20-2 may receive a D2D discovery notification broadcasted by the first wireless device 20-1 to establish a D2D communication link (S140).

The first wireless device 20-1 requests allocation of a resource for transmitting data to the second wireless device 20-2 to the base station 10 (S150). The base station 10 allocates a resource for transmitting data and provides the resource to the first wireless device 20-1 (S160).

The first wireless device 20-1 transmits data to the second wireless device 20-2 based on a resource allocated by the base station 10 (S170).

The 3GPP does not force separate resource allocation for performing soft combining in a HARQ procedure of D2D communication. Therefore, in an implementation process of the wireless device 20, the wireless device 20 cannot force to perform soft combining in a HARQ procedure of D2D communication without separately securing a soft-buffer. The instantaneous buffer is required only in a CA environment, but is not required in a single carrier environment. However, a D2D specification defines only an operation in a single carrier. Therefore, because the wireless device 20 performs D2D communication through a single carrier, an instantaneous buffer is in an idle state while performing only D2D communication.

<Disclosure of this Specification>

Hereinafter, a method of managing a buffer for performing soft combining in a HARQ procedure of D2D communication according to exemplary embodiments of this specification will be described.

In D2D communication, when the wireless device is in an RRC_IDLE state, a soft-buffer for performing a PDSCH HARQ procedure is in an idle state and thus the wireless device may perform soft combining using a soft-buffer of an idle state. However, when the wireless device is in an RRC_CONNECTED state, the wireless device should have no influence on a Wide Area Network (WAN) and thus the wireless device cannot use in principle a soft-buffer occupied by a PDSCH.

This specification suggests a method of using an instantaneous buffer and an HARQ buffer added for CA in soft combining for D2D communication. More specifically, a capability of the wireless device that can perform D2D communication supports maximum 50 or 400 sidelink processes in D2D discovery. In a case of D2D communication, the wireless device supports maximum 16 sidelink processes. Therefore, the wireless device that can perform D2D communication may perform soft combining based on the following priority.

1. Management Target of Soft-Buffer

A soft-buffer management target for performing soft combining corresponds to only a link procedure in which retransmission is set.

2. Priority of Link Procedure Processing

The wireless device preferentially processes a transmitting signal of D2D communication in which a cycle of a link procedure is short. This is because when a cycle of a link procedure is short, a cycle of retransmission may be short.

Further, the wireless device preferentially processes a transmitting signal of D2D communication having a low target Signal to Noise Ratio (SNR). This is because when a target SNR is low, a decoding success probability may be high.

3. Priority of Soft-Buffer Selection

A reference in which the wireless device selects a buffer for using as a soft-buffer among an instantaneous buffer and an HARQ buffer will be described with reference to FIG. 12.

Figure 12:
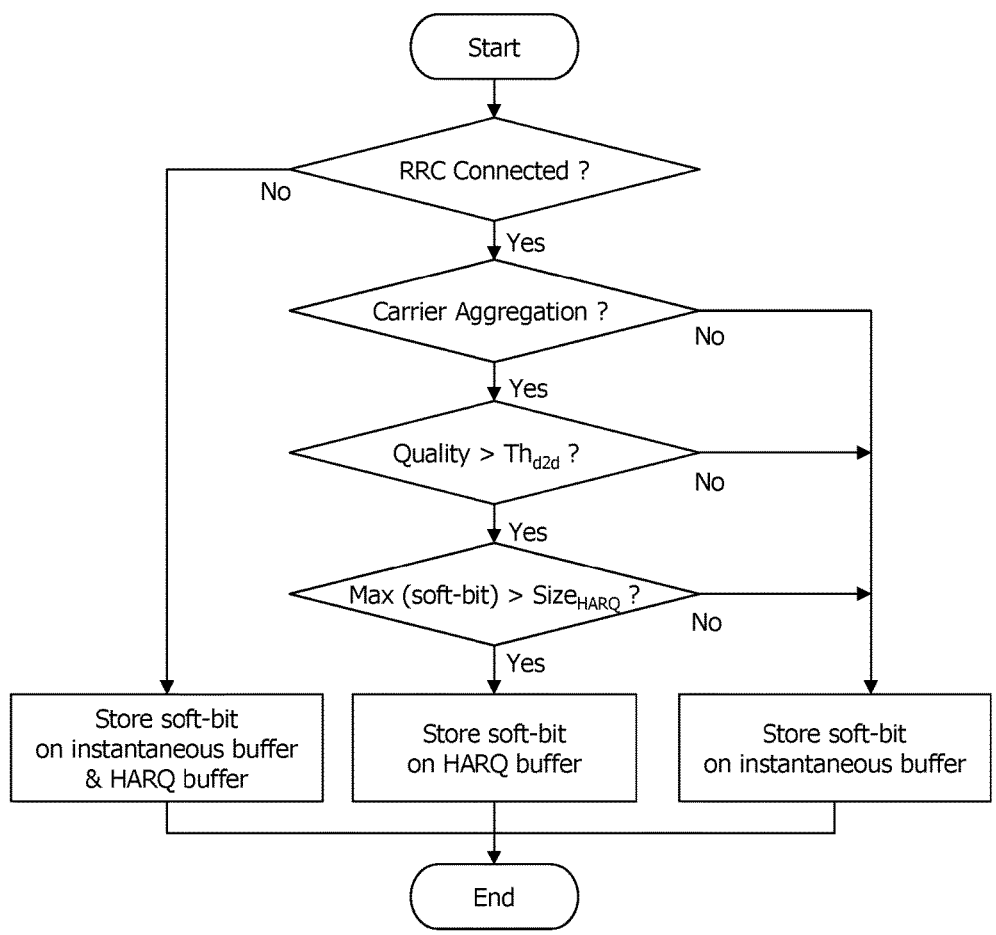
FIG. 12 is a flowchart illustrating a procedure for selecting a soft-buffer.

FIG. 12 is a flowchart illustrating a procedure for selecting a soft-buffer.

1) When the wireless device is in an RRC_IDLE state

The wireless device may perform soft combining using an instantaneous buffer and an HARQ buffer for a PDSCH without limit. That is, the wireless device may randomly select and freely use at least one buffer of the instantaneous buffer and the HARQ buffer in an RRC_IDLE state. In this case, the wireless device may divide and use an entire buffer including the instantaneous buffer and the HARQ buffer into the number of link procedures that support according to a capability of the wireless device.

2) When the wireless device is in an RRC_CONNECTED state

When the wireless device operates in a single carrier environment instead of CA, the wireless device may perform soft combining preferentially using the instantaneous buffer. This is because even if the wireless device is in an RRC_CONNECTED state, the instantaneous buffer is in an idle state in a single carrier environment.

When the wireless device operates in a CA environment, the wireless device selects a buffer according to the following priority based on a communication quality with the base station. Here, a communication quality may be at least one of an average receiving SNR and a reported Channel Quality Indicator (CQI), but the present invention is not limited thereto.

When an average receiving SNR or a CQI value is smaller than a reference value $Th_{D2D}$, the wireless device may perform soft combining preferentially using the instantaneous buffer. This is because a size of a transport block to be allocated to a PDSCH later is smaller than a size of a divided HARQ buffer and thus a situation requiring the instantaneous buffer does not occur.

When an average receiving SNR or a CQI value is larger than a reference value $Th_{D2D}$, if the soft bit number Max (Softbit) of an HARQ buffer allocated to an HARQ procedure to be retransmitted later due to an error, but scheduled in the past exceeds a size $Size_{HARQ}$ of a maximum HARQ buffer, the wireless device may perform soft combining preferentially using an HARQ buffer divided for the PDSCH. However, if the soft bit number Max (Softbit) of an HARQ buffer allocated to an HARQ procedure to be retransmitted later does not exceed a size $Size_{HARQ}$ of a maximum HARQ buffer, the wireless device may perform soft combining preferentially using the instantaneous buffer. This is because there is a possibility in which a size of a transport block to be allocated to the PDSCH later may exceed a size of a divided HARQ buffer.

When the wireless device may not preferentially use the instantaneous buffer or when the instantaneous buffer is allocated to an entire already transmitted link procedure, the wireless device selects a HARQ buffer according to the following priority.

When $K_{MIMO}$ is 2 (i.e., when a transmission mode of the wireless device is set to TM3/4/8/9/10 and when the wireless device receives a PDSCH), maximum two HARQ procedure may be allocated for one transmission time interval (TTI). In this case, when a Rank Indicator (RI) reported at the past is 1, the wireless device preferentially uses a buffer corresponding to a second HARQ procedure.

A HARQ procedure that stores a soft bit of a PDSCH having a small transport block size has a higher priority.

A HARQ procedure that stores a soft bit having a small Redundancy version (Rv) value among stored soft bits of a PDSCH has a higher priority. This is because a systematic bit is positioned at a front portion in a characteristic of LTE channel coding.

Figure 13:
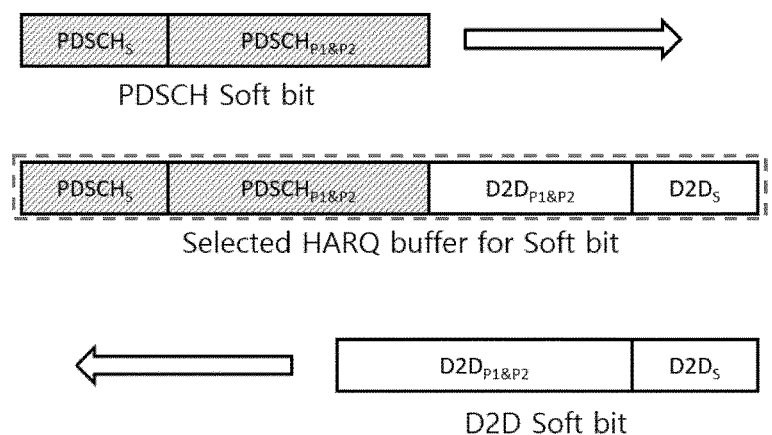
FIG. 13 is a conceptual diagram illustrating an operation for storing a soft-bit at a soft-buffer.

FIG. 13 is a conceptual diagram illustrating an operation for storing a soft-bit at a soft-buffer.

As shown in FIG. 13, when a soft bit of a D2D link procedure is stored at a HARQ buffer according to a determined priority, the wireless device may store the soft bit in reverse order from a final position of a soft-buffer. When a soft bit of a PDSCH is overlapped with a soft bit of an existing PDSCH, the soft bit of the PDSCH may have a priority of buffer use.

As described above, by using an instantaneous buffer added for CA as a soft-buffer for soft combining of D2D communication, a receiving performance of D2D communication can be improved.

Figure 14:
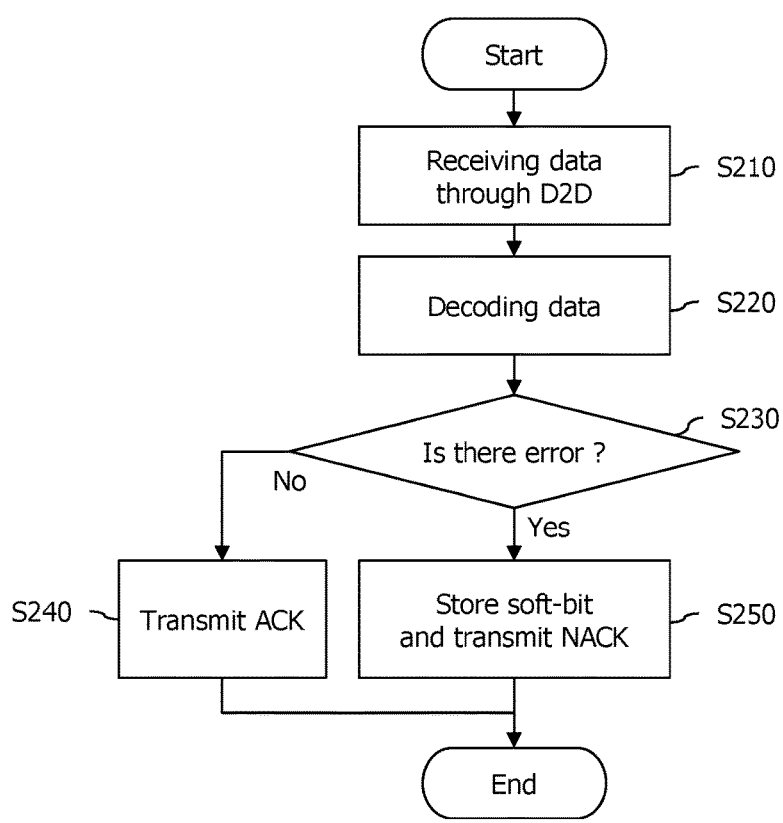
FIG. 14 is a flowchart illustrating a method of managing a soft-buffer according to this specification.

FIG. 14 is a flowchart illustrating a method of managing a soft-buffer according to this specification.

Referring to FIG. 14, the wireless device receives data through D2D communication (S210).

The wireless device decodes data received through D2D communication (S220). The wireless device determines whether an error exists in the decoded data (S230).

If an error does not exist in the decoded data, the wireless device transmits ACK (S240). If an error exists in the decoded data, the wireless device stores a soft bit at an instantaneous buffer and/or an HARQ buffer and transmits NACK (S250).

Particularly, in a method of managing a soft-buffer according to this specification, when an error exists in decoded data, the wireless device may determine whether an RRC connection with the base station is established and whether CA is activated, take at least one of an instantaneous buffer to be used when CA is activated and an HARQ buffer to be used when an RRC connection is established, and store a soft bit based on whether the RRC connection is established and whether CA is activated.

More specifically, when an RRC connection with the base station is not established, the wireless device may randomly take at least one buffer of the instantaneous buffer and the HARQ buffer and store a soft bit. When an RRC connection with the base station is established, but when the CA is not activated, the wireless device may preferentially take the instantaneous buffer rather than the HARQ buffer to store a soft bit. When an RRC connection with the base station is established and when CA is activated, the wireless device may determine whether to preferentially take which buffer of the instantaneous buffer and the HARQ buffer based on a Signal to Noise Ratio (SNR) received from the base station and a Channel Quality Indicator (CQI) value.

If the average receiving SNR or the CQI value is smaller than a predetermined threshold value, the wireless device may preferentially take the instantaneous buffer rather than the HARQ buffer and store a soft bit. If the average receiving SNR or the CQI value is larger than a predetermined threshold value, the wireless device may compare the bit number of the HARQ buffer allocated to a HARQ procedure for retransmission and a maximum HARQ buffer size and determine whether to preferentially take which buffer of the instantaneous buffer and the HARQ buffer. When the bit number of a HARQ buffer allocated to the HARQ procedure for retransmission does not exceed the maximum HARQ buffer size, the wireless device may preferentially take the instantaneous buffer rather than the HARQ buffer.

Further, when storing the soft bit in at least one taken buffer, the wireless device may store a soft bit in reverse order from a final position of the taken buffer.

Embodiment of the present invention may be implemented through various means. For example, the embodiments of the present invention may be implemented by hardware, firmware, software, or a combination thereof.

According to hardware implementation, the method according to the embodiments of the present invention may be implemented using Application Specific Integrated Circuits (ASICs), digital signal processors (DSPs), digital signal processing devices (DSPDs), programmable logic devices (PLDs), field programmable gate arrays (FPGAs), processors, controllers, micro-controllers, microprocessors.

According to firmware or software implementation, the method according to the embodiments of the present invention may be implemented in the form of a module, a procedure or a function to perform the above functions or operation. A software code is stored in a memory unit so that the software code may be driven by a processor. The memory unit may be located inside or outside the processor to exchange data with the processor by various know means. The wireless communication system according to an embodiment of the present invention will be described with reference to FIG. 15.

Figure 15:
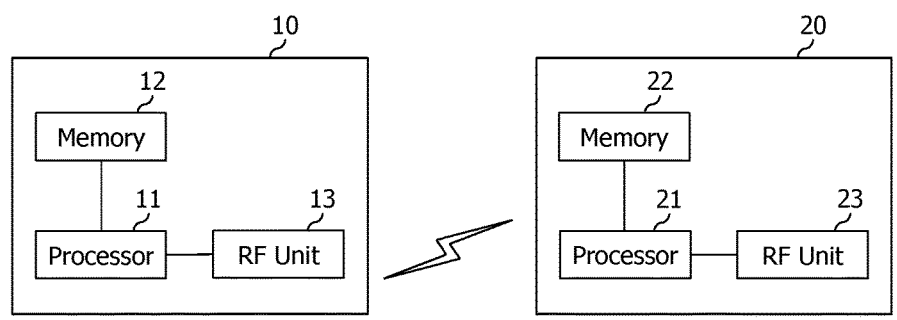
FIG. 15 is a block diagram illustrating a wireless communication system in which an exemplary embodiment of this specification is implemented.

FIG. 15 is a block diagram illustrating a wireless communication system according to an embodiment of the present invention.

A base station 10 includes a processor 11, a memory 12, and a radio frequency (RF) unit 13. The memory 12 is connected to the processor 11 to store various information for driving the processor 11. The RF unit 13 is connected to the processor 11 to transmit and/or receive a wireless signal. The processor 11 implements a suggested function, procedure, and/or method. An operation of the base station 10 according to the above embodiment may be implemented by the processor 11.

A wireless device 20 includes a processor 21, a memory 22, and an RF unit 23. The memory 22 is connected to the processor 21 to store various information for driving the processor 21. The RF unit 23 is connected to the processor 21 to transmit and/or receive a wireless signal. The processor 21 implements a suggested function, procedure, and/or method. An operation of the wireless 20 according to the above embodiment may be implemented by the processor 21.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method in which a wireless device manages a buffer for performing soft combining, the method comprising:
   decoding data received through Device-to-Device (D2D) communication;
   determining that an error exists in the decoded data;
   when the error exists in the decoded data, determining that a Radio Resource Control (RRC) connection with a base station is established and determining that carrier aggregation is activated;
   selecting at least one of an instantaneous buffer and a Hybrid Automatic Repeat reQuest (HARQ) buffer based on the determination that the RRC connection is established and the determination that the carrier aggregation is activated; and
   storing a soft bit for performing the soft combining at the at least one selected buffer,
   wherein the instantaneous buffer is selected to be used when the carrier aggregation is activated and the HARQ buffer is selected to be used when the RRC connection is established, and wherein the selecting of the at least one buffer comprises:
preferentially selecting the instantaneous buffer rather than the HARQ buffer, when the RRC connection with the base station is established and the carrier aggregation is not activated.

2. The method of claim 1, wherein the selecting taking of the at least one buffer further comprises:
preferentially selecting one of the instantaneous buffer and the HARQ buffer based on an average receiving Signal to Noise Ratio (SNR) of a signal received from the base station or a Channel Quality Indicator (CQI) value, when the RRC connection with the base station is established and when the carrier aggregation is activated.

3. The method of claim 2, wherein the selecting taking of the at least one buffer further comprises:
preferentially selecting the instantaneous buffer rather than the HARQ buffer, when the average receiving SNR or the CQI value is smaller than a predetermined threshold value.

4. The method of claim 2, wherein the selecting taking of the at least one buffer further comprises:
preferentially selecting one of the instantaneous buffer and the HARQ buffer based on the bit number of a HARQ buffer allocated to a HARQ procedure for retransmission and a maximum HARQ buffer size, when the average receiving SNR or the CQI value is larger than a predetermined threshold value.

5. The method of claim 4, wherein the selecting taking of the at least one buffer further comprises:
preferentially selecting the instantaneous buffer rather than the HARQ buffer, when the bit number of the HARQ buffer allocated to the HARQ procedure for the retransmission does not exceed the maximum HARQ buffer size.

6. The method of claim 1, wherein the selecting of the at least one buffer further comprises:
randomly selecting at least one buffer of the instantaneous buffer and the HARQ buffer when the RRC connection with the base station is not established.

7. The method of claim 1, wherein the storing of the soft bit comprises:
storing the soft bit at the at least one selected buffer in reverse order from a final position of the at least one selected buffer.

8. A wireless device that manages a buffer for performing soft combining, the wireless device comprising:
a transceiver that transmits and receives a wireless signal; and
a processor operatively connected to the transceiver, wherein the processor is configured to:
decode data received through Device-to-Device (D2D) communication;
determine that an error exists in the decoded data;
when an error exists in the decoded data, determine that a Radio Resource Control (RRC) connection with the base station is established and determine that carrier aggregation is activated;
select at least one of an instantaneous buffer and a Hybrid Automatic Repeat reQuest (HARQ) buffer based on the determination that the RRC connection is established and the determination that the carrier aggregation is activated; and
store a soft bit for performing the soft combining at the at least one selected buffer,
wherein the instantaneous buffer is selected to be used when the carrier aggregation is activated and the HARQ buffer is selected to be used when the RRC connection is established, and
wherein the selecting of the at least one buffer comprises:
preferentially selecting the instantaneous buffer rather than the HARQ buffer, when the RRC connection with the base station is established and the carrier aggregation is not activated.

9. The wireless device of claim 8, wherein the processor is further configured to:
preferentially select one of the instantaneous buffer and the HARQ buffer based on an average receiving Signal to Noise Ratio (SNR) of a signal received from the base station or a Channel Quality Indicator (CQI) value, when the RRC connection with the base station is established and when the carrier aggregation is activated.

10. The wireless device of claim 9, wherein the processor is further configured to:
preferentially select the instantaneous buffer rather than the HARQ buffer, when the average receiving SNR or the CQI value is smaller than a predetermined threshold value.

11. The wireless device of claim 9, wherein the processor is further configured to:
preferentially select one of the instantaneous buffer and the HARQ buffer based on the bit number of a HARQ of an HARQ buffer allocated to a HARQ procedure for retransmission and a maximum HARQ buffer size when the average receiving SNR or the CQI value is larger than a predetermined threshold value.

12. The wireless device of claim 11, wherein the processor is further configured to:
preferentially select the instantaneous buffer rather than the HARQ buffer, when the bit number of the HARQ buffer allocated to the HARQ procedure for the retransmission does not exceed the maximum HARQ buffer size.

13. The wireless device of claim 8, wherein the processor is further configured to:
randomly select at least one buffer of the instantaneous buffer and the HARQ buffer when the RRC connection with the base station is not established.

14. The wireless device of claim 8, wherein the processor is further configured to:
store the soft bit at the at least one selected buffer in reverse order from a final position of the at least one selected buffer.

* * * * *